June 20, 1961 D. M. CLAPP ET AL 2,989,169
CONVEYOR MECHANISMS
Filed March 19, 1959 5 Sheets-Sheet 1
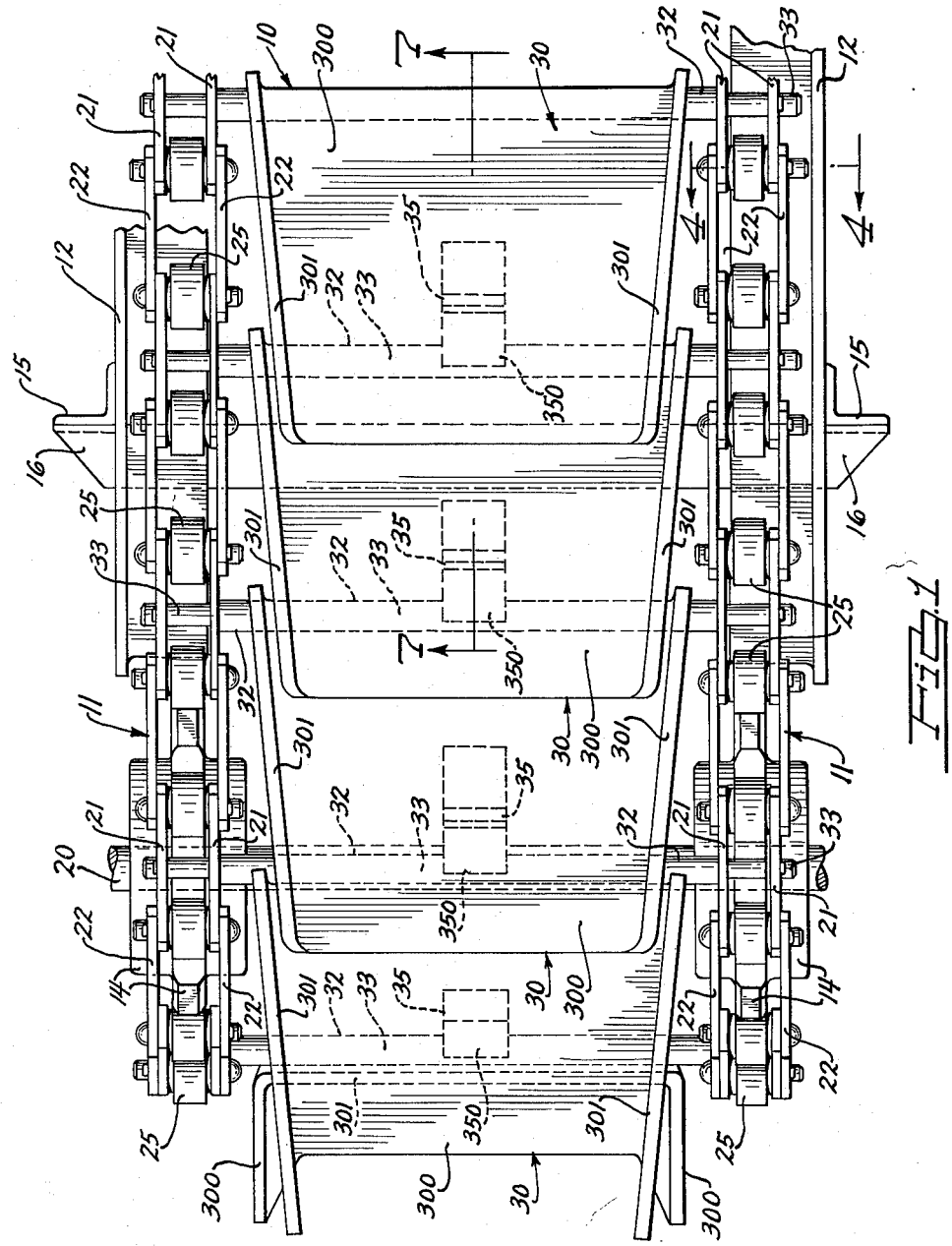
INVENTORS
DAVID M. CLAPP &
BY JAMES R. MITCHELL
*Everett F. Wright*
ATTORNEY June 20, 1961   D. M. CLAPP ET AL   2,989,169
CONVEYOR MECHANISMS
Filed March 19, 1959   5 Sheets-Sheet 2
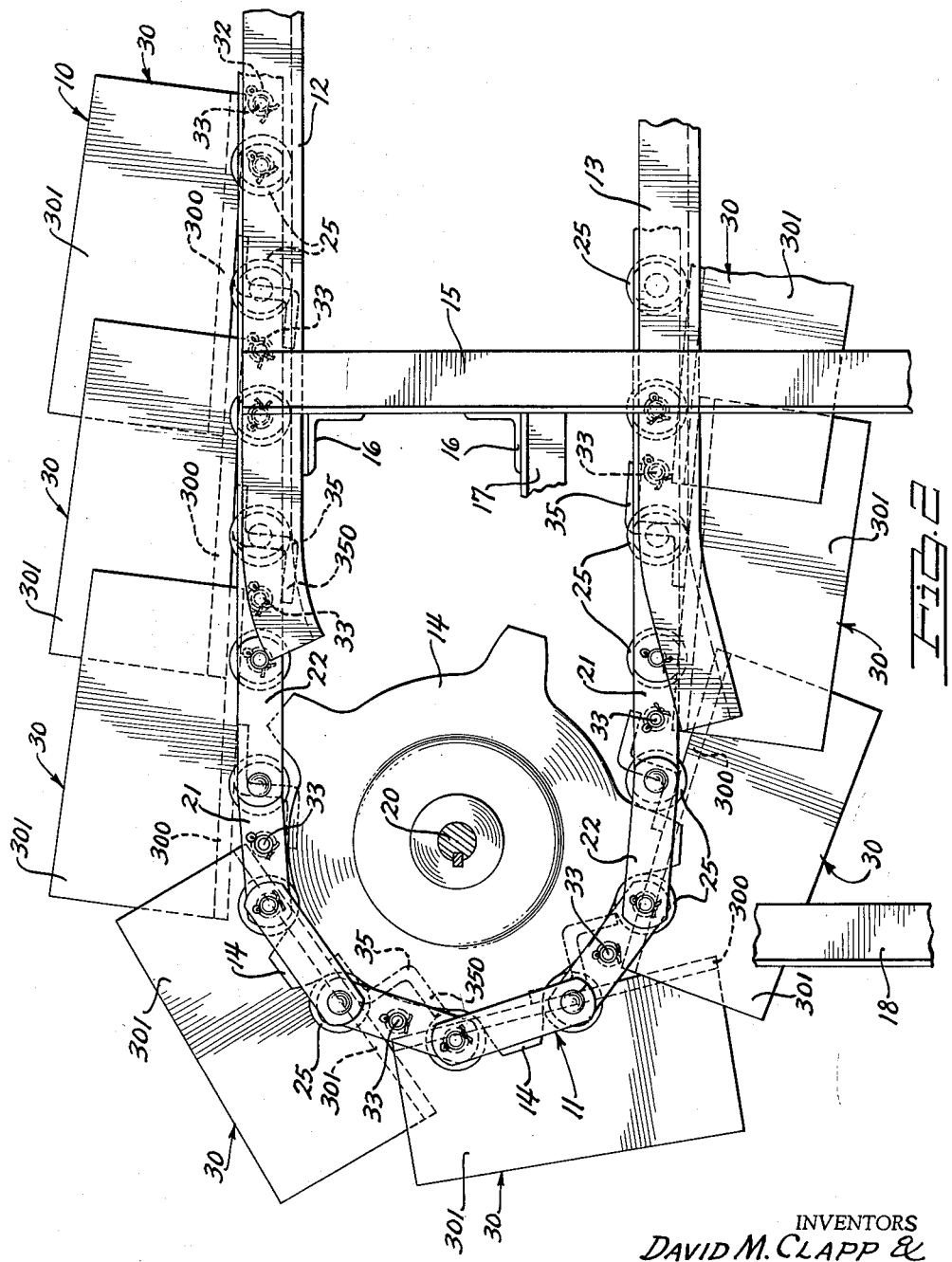
INVENTORS
DAVID M. CLAPP &
BY JAMES R. MITCHELL
Everett G. Wright,
ATTORNEY

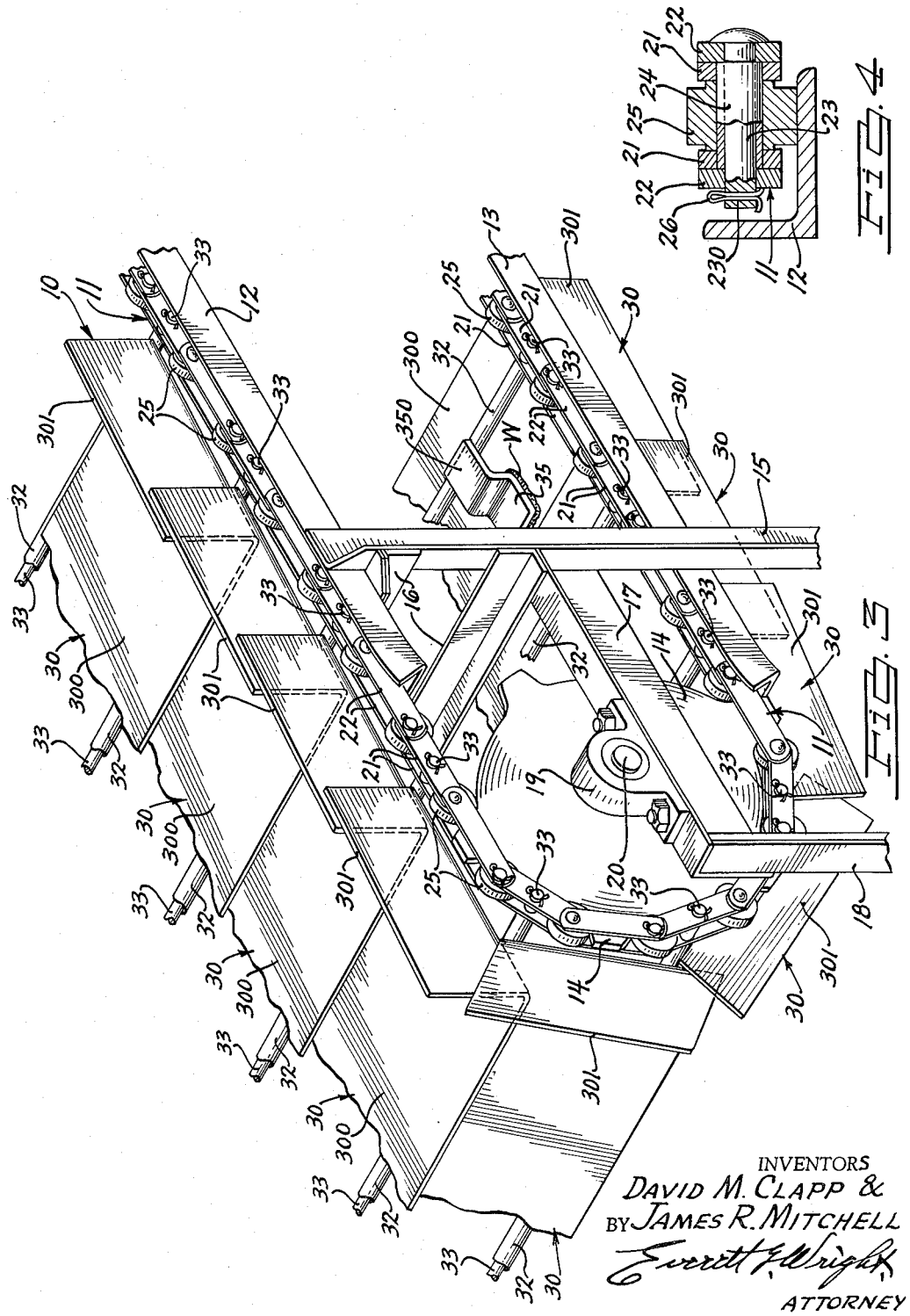

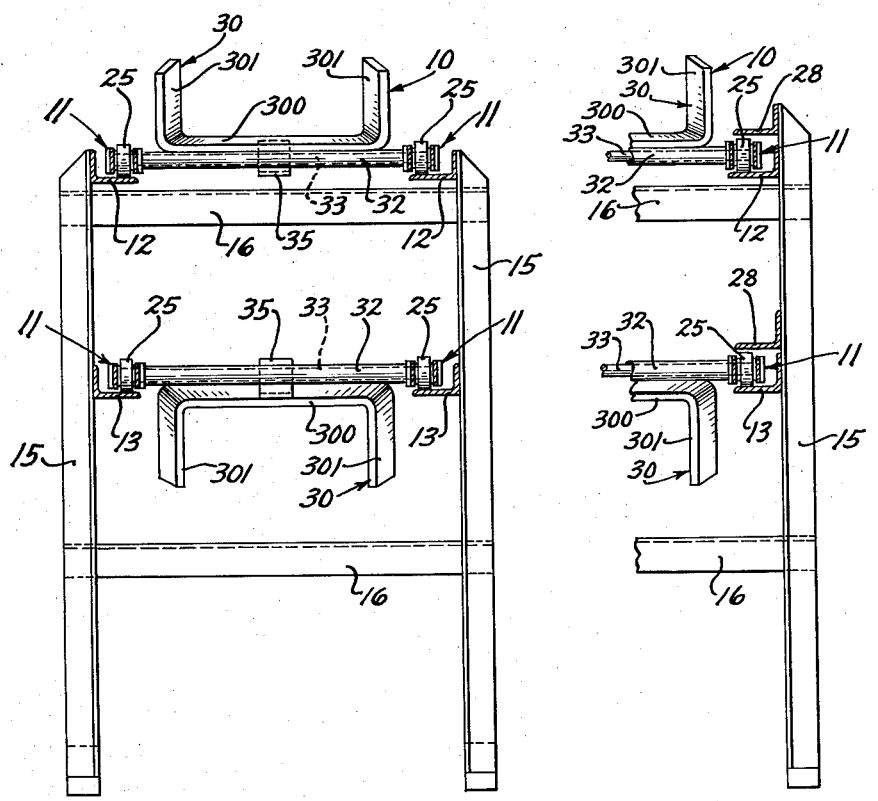
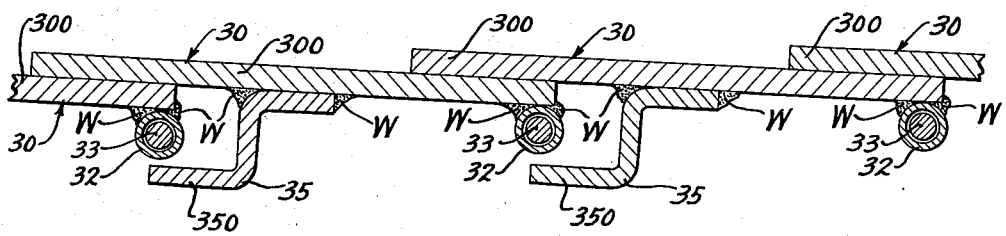

June 20, 1961   D. M. CLAPP ET AL   2,989,169
CONVEYOR MECHANISMS
Filed March 19, 1959   5 Sheets-Sheet 5
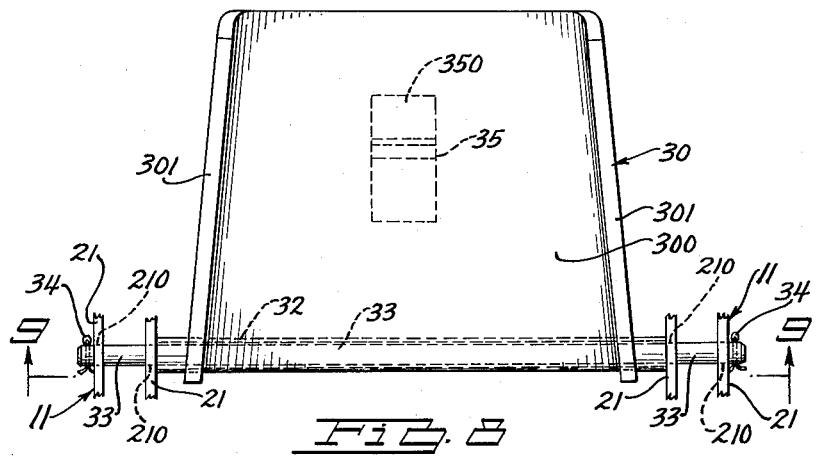
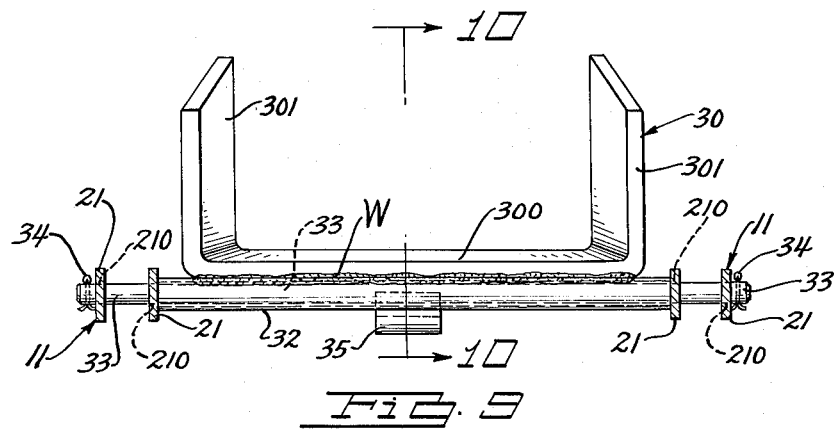
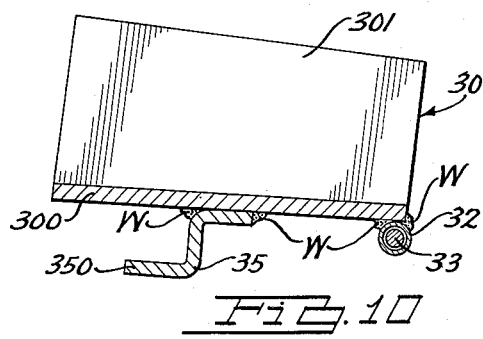
INVENTORS
DAVID M. CLAPP &
BY JAMES R. MITCHELL
ATTORNEY United States Patent Office 2,989,169
Patented June 20, 1961

2,989,169
CONVEYOR MECHANISMS
David M. Clapp, Detroit, and James R. Mitchell, Franklin, Mich., assignors to Service Conveyor Co., a corporation of Michigan
Filed Mar. 19, 1959, Ser. No. 800,582
1 Claim. (Cl. 198—196)

This invention relates to improvements in pan type conveyors and more particularly to an improved endless chain pan conveyor usable in all general type pan conveying operations including the conveying of articles or materials through ovens and the like.

The primary object of the invention is to provide an improved, simply constructed, inexpensive to manufacture and readily serviced continuous pan type conveyor which may be employed in the conveying of bulk, granular or pebbled material as well as small and large parts.

A further object of the invention is to provide an improved continuous pan type conveyor wherein the pans thereof are alike, each formed with its bottom and sides as a unitary element, and with the leading end of each pan telescopingly disposed in the preceding pan of the conveyor flight.

Another object of the invention is to provide an improved chain drive pan conveyor which employs with each pan a tubular mounting sleeve across the bottom at the rear thereof, and pivot rod means disposed through said mounting sleeve adapted to hingedly support and connect each said pan to laterally opposite links of the drive chain of the conveyor link at a place other than the link pins of said drive chain, only one hinged support being employed for each conveyor pan located at each or at selected spaced links of the conveyor drive chain, each said pan including at its forward end retainer clip means adapted to pivotally engage the tubular mounting sleeve at the rear of the preceding conveyor pan on the return flight thereof.

Another object of the invention is to provide a continuous pan conveyor in which the pan spacing is not dependent upon the pitch of the conveyor chain, and in which one pan per pitch of the conveyor chain may be used, or, if desired, one pan may be employed at every second, third or more conveyor chain link.

Another object of the invention is to provide a pan conveyor in which the side plates of the pans thereof need not be offset, the pans employed being readily formed by simple inexpensive shear and break operations.

Another object of the invention is to provide an improved pan conveyor which has less operational friction when slight misalignment thereof may occur than other pan conveyors, and wherein minor pan damage or warpage will not adversely affect the operation thereof.

A further object of the invention is to provide an improved pan conveyor employing a tubular pivot sleeve across each pan thereof with a pivot rod therethrough connected to a chain link spaced from the chain pivot pins, which pivot sleeves and pivot rods serve the combined function of chain spacers and pan spacers.

Other objects of the invention will become apparent by reference to the following detailed description taken in connection with the accompanying drawings, in which:

FIG. 1 is a fragmentary top plan view of an improved pan conveyor embodying the invention, the material discharge end of the conveyor being illustrated.

FIG. 2 is a side elevational view of the improved pan conveyor shown in FIG. 1 with the sprocket shaft supports omitted.

FIG. 3 is a fragmentary view in perspective of the illustrative embodiment of the invention disclosed in FIGS. 1 and 2.

FIG. 4 is an enlarged sectional view through a typical conveyor chain link pin, roller and track element taken on the line 4—4 of FIG. 1.

FIG. 5 is a more or less diagrammatic sectional view through the conveyor disclosed in FIGS. 1-4 inclusive at a typical support for a level flight.

FIG. 6 is a fragmentary more or less diagrammatic sectional view similar to FIG. 5 showing a retainer track disposed above the usual guide and support track, the said retainer track being used in instances where the travel of the conveyor changes grade.

FIG. 7 is a longitudinal sectional view of overlapping conveyor pans taken substantially on the line 7—7 of FIG. 1.

FIG. 8 is a top plan view of a conveyor pan of the type employed in the improved pan conveyor disclosed in FIGS. 1-7 inclusive, the showing of a pivot rod and chain links being included to indicate the mounting of the conveyor pan on a conveyor chain.

FIG. 9 is a trailing end elevational view taken on the line 9—9 of FIG. 8.

FIG. 10 is a cross sectional view taken on the line 10—10 of FIG. 9.

Referring now to the drawings wherein like reference numerals refer to like and corresponding parts throughout the several views, the particular pan conveyor 10 disclosed for the purpose of illustrating the invention consists of a pair of continuous roller conveyor chains 11 supported on and guided by upper and lower pairs of guide rails 12 and 13 respectively and front and rear pairs of sprockets 14. Each pair of sprockets 14 is keyed on a transverse sprocket shaft 20. Only the sprockets 14 at the front or discharge end of the pan conveyor 10 and the front sprocket shaft 20 is shown in the drawings.

The guide rails 12 and 13 on each side of the pan conveyor 10 are supported on suitable stanchions 15 which are cross braced by struts 16. In instances where the travel of the conveyor changes grade, a retainer track 28 may be employed above each guide rail 12 and 13 at the point of change in grade, see FIG. 6. Additional longitudinal and vertical framing at 17 and 18 located laterally outwardly of each sprocket 14 supports a pillow block 19 through which one end of a sprocket shaft 20 is journaled. A conventional motor and speed reducer, not shown, drives one of the sprocket shafts 20, thus driving one pair of sprockets 14 which in turn drives the laterally spaced endless roller chains 11 of the pan conveyor 10. Inasmuch as the above described portion of the pan conveyor 10 is of conventional construction, only so much thereof as is necessary to disclose and illustrate the instant invention has been shown in the drawings.

The type of roller conveyor chain 11 preferably employed consists of alternate pairs of longitudinally disposed laterally spaced inner and outer links 21 and 22 respectively, each pair of links 21 and 22 being connected together by headed link pins 23. A sleeve 24 journaled over each link pin 23 spaces the outer links 22 while the inner links 21 are telescoped thereover. A roller 25 is centrally mounted on the sleeve 24 and serves as a spacer for the inner links 21. The several components of the roller conveyor chain 11 are assembled as best shown in FIGS. 1 and 4 with a cotter pin 26 extending through a diametrically disposed aperture 230 in the free slightly extending end of each link pin 23.

Conveyor pans 30 of the pan conveyor 10 are preferably formed from flat sheet metal into a trough shape as shown throughout the drawings. Each conveyor pan 30 includes a base portion 300 tapered laterally from rear to front, and is wider at the rear thereof than at the front thereof, and is provided with integral side members 301 forming a trough. The said conveyor pans 30 are so proportioned as to permit the leading or narrow end of each pan to nest into the rear or wide end of the next preceding pan of the pan conveyor 10, see FIGS. 1 and 3.

Each conveyor pan 30 is provided with a laterally central tubular combined pivot and spacer element 32 disposed transversely across the bottom thereof at the rear thereof, and is welded thereto at W as shown in the drawings. The said spacer element 32 is of the proper length to abut against the laterally innermost links of selected opposite pairs of inner links 21 of the roller conveyor chain 11. The said selected pairs of inner chain links 21 are suitably apertured at 210 to telescopingly receive a pivot rod 33 therethrough. A pivot rod 33 is telescoped through each combined pivot and spacer element 32, and through the apertures 210 in the said selected pairs of inner chain links 21. The ends of the said pivot rod 33 extend slightly beyond the outermost link of the said selected pairs of inner chain links 21 of the roller conveyor chain 11, see FIGS. 8 and 9, and said pivot rod 33 is diametrically bored adjacent the outer side of the outermost links of opposite pairs of inner links 21 of the conveyor chain 11 to accommodate cotter pins 34. As an alternate, the said pivot rods 33 may be supported by laterally opposite selected pairs of outer chain links 22, in which event the combined pivot and spacer element 32 would be slightly shorter and the pivot rods 33 would be slightly longer than when the pivot rods 33 are supported on laterally opposite selected pairs of inner chain links 21.

Thusly, the pivot rod 33 and pivot and spacer element 32 located at the bottom of the rear end of each conveyor pan 30 pivotally supports the rear of each said conveyor pan 30 in lateral central spaced relationship between the roller conveyor chains 11, and simultaneously gages the said continuous roller conveyor chains 11 to travel on their guide rails 12 and 13 and onto and around the sprockets 14 located at each end of the said continuous roller chains 11. The length of each conveyor pan 30 is such in relationship to the longitudinal spacing of the selected pairs of inner chain links 21 onto which the rear end of each conveyor pan 30 is pivotally supported that the forward end of each conveyor pan 30 will nest in the rear of the next preceding conveyor pan 30 as best shown in FIGS. 1 and 3.

A Z-shaped retainer clip 35 is welded at W or otherwise secured to the bottom of the base 300 of each conveyor pan 30 at the lateral center thereof located so that its forwardly disposed portion 350 is sufficiently spaced from the said base 300 to underlie the tubular pivot and spacer element 32 of the next preceding conveyor pan as best shown in FIG. 7. The retainer clip 35 functions only when the said conveyor pans 30 are disposed in other than their normal conveying position during the travel of the endless conveyor chains 11. In other words, on the conveying flight of the pans 30, the forwardly disposed portion 350 of the clips 35 of each pan 30 are spaced from the rear end of the preceding conveyor pan 30, and, when the said conveyor pans 30 are inverted on the return flight of the pans 30, the forward ends of the said pans 30 are hung by the said retainer clips 35 on the tubular pivot and spacer element 32 at the rear end of the next preceding conveyor pan 30. If the tubular pivot and spacer element 32 is located slightly forward of the rear end of each conveyor pan 30, then the forwardly disposed portion 350 of each retainer clip 35 will be disposed to engage the rear end of the base 300 of the preceding conveyor pan 30.

The invention provides an extremely economical to manufacture, readily repaired and serviced, rugged pan type conveyor wherein the pans are simply constructed and mounted on the conveyor chains at points other than at the chain pivot pins which makes repair and/or replacement of damaged pans a minor service item without necessity for dismantling the conveyor chain drive mechanism to accomplish the repairs. Furthermore, unless the pans are badly damaged, a pan conveyor embodying the invention cannot bind and become inoperative during use.

Although but a single embodiment of the invention has been disclosed and described in detail, it is obvious that many changes may be made in the size, shape, arrangement and detail of the various elements of the invention, all without departing from the spirit and scope thereof as defined by the appended claim.

We claim:

In a pan conveyor, longitudinally movable laterally spaced continuous endless conveyor chains including a plurality of longitudinally disposed links connected together by link pins with a roller journaled on said link pins, track and sprocket means supporting and guiding said roller conveyor chains, a series of conveyor pans including a tapered base and integral side plates, said conveyor pans being nested in vertical overlapping tandem relationship, a tubular pivot sleeve fixed to the bottom of the rear end of each conveyor pan extending in abutment between opposite inner links of said conveyor chains longitudinally between link pins thereof laterally spacing said conveyor chains, a pivot pin positioned through each said pivot sleeve and extending through opposite pairs of chain links longitudinally between the link pieces of said pairs of chain links, means on the bottom of each conveyor pan formed to engage the pivot sleeve of the next preceding conveyor pan for retaining the forward end of each said conveyor pan in said nested relationship within the rear of said next preceding conveyor pan when the said conveyor pans are traveling in other than their normal conveying position during the travel of the said endless conveyor chains.

References Cited in the file of this patent
UNITED STATES PATENTS

| 314,790 | Briscoe et al. | Mar. 31, 1885 |
| 720,963 | Petersen | Feb. 17, 1903 |
| 967,424 | O'Toole | Aug. 16, 1910 |
| 1,291,446 | Dull | Jan. 14, 1919 |